(12) United States Patent
Lee

(10) Patent No.: US 11,572,927 B2
(45) Date of Patent: Feb. 7, 2023

(54) SUBFRAME MOUNTING BUSH STRUCTURE

(71) Applicants: Hyundai Motor Company, Seoul (KR); Kia Motors Corporation, Seoul (KR)

(72) Inventor: Jong-Woo Lee, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 343 days.

(21) Appl. No.: 16/820,894

(22) Filed: Mar. 17, 2020

(65) Prior Publication Data

US 2021/0148429 A1    May 20, 2021

(30) Foreign Application Priority Data

Nov. 20, 2019    (KR) .................. 10-2019-0149223

(51) Int. Cl.
| | |
|---|---|
| *F16F 1/38* | (2006.01) |
| *B62D 25/08* | (2006.01) |
| *F16F 1/373* | (2006.01) |
| *B62D 24/02* | (2006.01) |

(52) U.S. Cl.
CPC ............ *F16F 1/3842* (2013.01); *B62D 24/02* (2013.01); *B62D 25/08* (2013.01); *F16F 1/3732* (2013.01)

(58) Field of Classification Search
CPC ...... F16F 1/3842; F16F 1/3732; F16F 1/3735; F16F 1/38; F16F 1/3814; B62D 24/02
See application file for complete search history.

(56) References Cited

U.S. PATENT DOCUMENTS

| | | | | |
|---|---|---|---|---|
| 5,722,631 | A | * | 3/1998 | Dorton ...................... F16F 1/38 |
| | | | | 267/141 |
| 2008/0029943 | A1 | * | 2/2008 | Mayerboeck ......... F16F 1/3842 |
| | | | | 267/141.2 |
| 2019/0039656 | A1 | * | 2/2019 | Kulkarni ................. F16F 15/08 |

FOREIGN PATENT DOCUMENTS

| | | | | |
|---|---|---|---|---|
| CN | 109611484 | A * | 4/2019 | |
| DE | 29624383 | U1 * | 1/2003 | ............. B60G 7/001 |
| KR | 20040033578 | A | 4/2004 | |
| WO | WO-9710466 | A1 * | 3/1997 | ............ F16B 5/0258 |

* cited by examiner

*Primary Examiner* — Melanie Torres Williams
(74) *Attorney, Agent, or Firm* — Slater Matsil, LLP

(57) ABSTRACT

A subframe mounting bush structure for improving NVH performance is provided. The subframe mounting bush structure includes an outer shell, a first bridge formed in the outer shell along a longitudinal direction, a second bridge formed in the outer shell along the longitudinal direction, a first inner shell positioned at a center of the first bridge, and a second inner shell positioned at a center of the second bridge.

19 Claims, 8 Drawing Sheets

SUBFRAME MOUNTING BUSH STRUCTURE

CROSS-REFERENCE TO RELATED APPLICATIONS

This application claims priority to Korean Patent Application No. 10-2019-0149223, filed on Nov. 20, 2019, which application is hereby incorporated herein by reference.

TECHNICAL FIELD

The present disclosure relates to a subframe mounting bush structure.

BACKGROUND

A subframe mounting bush is a component for connecting a suspension with a vehicle body. The subframe mounting bush should enhance the responsiveness by quickly delivering the load from the suspension to the vehicle body during acceleration, braking, and handling. Further, the subframe mounting bush should enhance noise, vibration and harshness (NVH) performance by insulating the vibration from the suspension during normal constant speed running.

However, the characteristics (rigidity/damping) of the mounting bush made of rubber may not improve both functions. This is because the rigidity/damping should be large for the responsiveness, but the rigidity/damping should be small for the insulation (NVH) performance.

In order to overcome this conflicting performance, a hydro bush for increasing damping only at a specific frequency is used, but a complex structure leads to increased costs and increased field claims.

The contents described in the Background are to help the understanding of the background of the present disclosure, and may include what is not previously known to those skilled in the art to which the present disclosure pertains.

SUMMARY

The present disclosure relates to a subframe mounting bush structure that can improve NVH performance. Particular embodiments relate to a subframe mounting bush structure that can improve NVH performance by maintaining lateral rigidity characteristics while increasing a vibration insulation rate.

Therefore, an embodiment of the present disclosure provides a subframe mounting bush structure for improving NVH performance, which improves a subframe mounting bush structure, thereby enhancing the handling responsiveness from a suspension, and enhancing the vibration insulation.

A subframe mounting bush structure according to an embodiment of the present disclosure includes an outer shell, a first bridge formed in the outer shell along a longitudinal direction, and a second bridge formed in the outer shell along the longitudinal direction. A first inner shell is positioned at the center of the first bridge, and a second inner shell is positioned at the center of the second bridge.

Further, the outer shell may be an elliptic pipe form in which a length of a width direction is larger than the length of the longitudinal direction.

Further, in the inner circumferential surface of the outer shell, a first side surface space may be formed between a portion adjacent to one end portion of the outer shell in the width direction and the first bridge, in the inner circumferential surface of the outer shell, a second side surface space may be formed between a portion adjacent to the other end portion of the outer shell in the width direction and the second bridge, and an inter-space may be formed between the first bridge and the second bridge.

Further, the first side surface space and the second side surface space may be the same size, and the inter-space may be larger in size than the first side surface space or the second side surface space.

Further, in the inner circumferential surface of the outer shell, a reinforcement rubber may be provided on a portion adjacent to both end portions of the outer shell in the width direction.

Further, a mounting hole may be formed in the first bridge and the second bridge so that the first inner shell or the second inner shell is positioned at the center thereof, the central portion of the inner circumferential surface of the mounting hole may be a form that is protruded roundly toward the axis center thereof, and both end portions of the inner circumferential surface of the mounting hole may be a flat form.

Further, a rubber bridge for connecting the first bridge with the second bridge may be positioned in the inter-space, and the rubber bridge may be connected with the central portion of the mounting hole.

Further, a rubber bridge may be provided between the first bridge and the second bridge, the rubber bridge may be positioned on the line connecting the first inner shell with the second inner shell, and the rubber bridge may not contact the inner circumferential surface of the outer shell.

Further, when a vehicle body and a subframe are connected to each other, lower plates different from each other may be disposed at one side of the first inner shell and the second inner shell, respectively, so that a bolt fixed to the vehicle body passes through.

Further, the rigidities of the first bridge and the second bridge may be the same as each other.

Further, one or more bridges may be additionally formed in the outer shell, and an inner shell may be positioned at the center of the added bridge.

Further, the rigidities of the bridges formed in the outer shell may be the same as each other.

Further, a rubber member having a ring form may be provided in the inner circumferential surface of the outer shell, and the end portions of the first bridge and the second bridge may be connected to the rubber member.

A subframe mounting bush structure for improving NVH performance according to an embodiment of the present disclosure has the characteristics that an outer shell is formed so that the length of the width direction is longer than that of the longitudinal direction, two or more inner shells are provided in the outer shell, two or more bridges for fixing the two or more inner shells are formed in the outer shell, and the rigidities of the two or more bridges are the same as each other.

According to the subframe mounting bush structure for improving the NVH performance according to an embodiment of the present disclosure configured as described above, it is possible to embed two or more inner shells and two or more bridges in the outer shell, thereby enhancing the handling responsiveness and also enhancing the vibration insulation.

Further, even if the rigidity of each of the two or more bridges embedded in the outer shell is reduced to $1/(2+n)$ compared to the rigidity of the bridge formed in the conventional outer shell, the same suspension lateral rigidity may be generated. Further, the vibration insulation rate increases as the rigidity of the bridge is decreased.

DETAILED DESCRIPTION OF ILLUSTRATIVE EMBODIMENTS

Hereinafter, a subframe mounting bush structure for improving NVH performance according to an embodiment of the present disclosure will be described with reference to the accompanying drawings.

A subframe mounting bush structure for improving NVH performance according to an embodiment of the present disclosure has the characteristics that an outer shell 100 is formed so that the length of the width direction (D1) is longer than that of the longitudinal direction (D2), two or more inner shells 200 are provided in the outer shell 100, two or more bridges 400, 500 for fixing the two or more inner shells 200 are formed in the outer shell 100, and the rigidities of the two or more bridges 400, 500 are the same as each other.

As illustrated in FIGS. 1 to 7, in an embodiment, two inner shells 200 are provided in the outer shell 100, and a total of two bridges 400, 500 are also provided therein. Unlike the illustrated contents, two or more inner shells 200 may also be positioned in the outer shell 100 at equal intervals.

Figure 1:
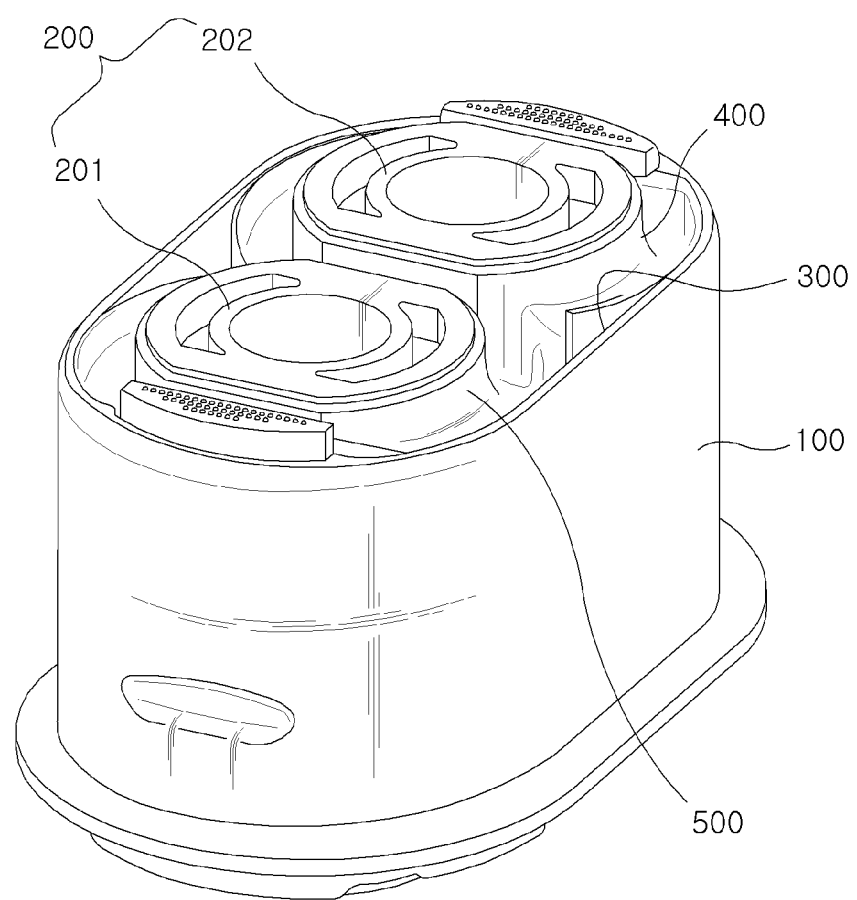
FIG. 1 is an exemplary diagram illustrating a subframe mounting bush structure for improving NVH performance according to an embodiment of the present disclosure.
Figure 2:
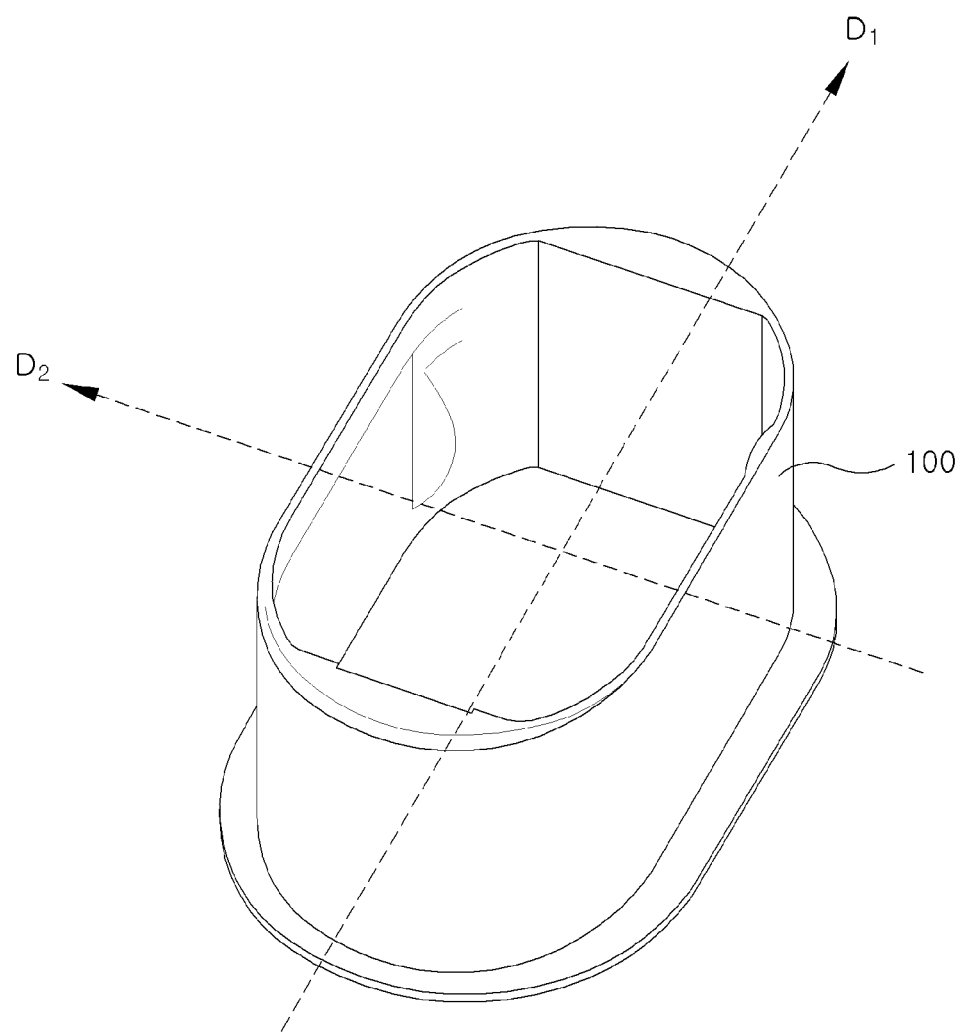
FIG. 2 is an exemplary diagram illustrating an outer shell provided in the subframe mounting bush in FIG. 1.

As illustrated in FIGS. 1 and 2, the outer shell 100 is formed in an elliptic pipe form in which the length of the width direction (D1) is larger than the length of the longitudinal direction (D2) perpendicular to the width direction (D1). The lower end portion of the outer shell 100 is formed with a wing for increasing the contact area with a lower plate (P) in a disk form. The wing may also be either a flange or a washer. The outer shell 100 is made of a steel material.

The inner shell 200 embedded in the outer shell 100 is made of plastic, steel, or the like. A bolt (B) of a steel material fixed to a vehicle body or a subframe passes through the inner shell 200. The inner shell 200 is manufactured to have strength and rigidity that are not damaged even when contacting the bolt (B).

Figure 3:
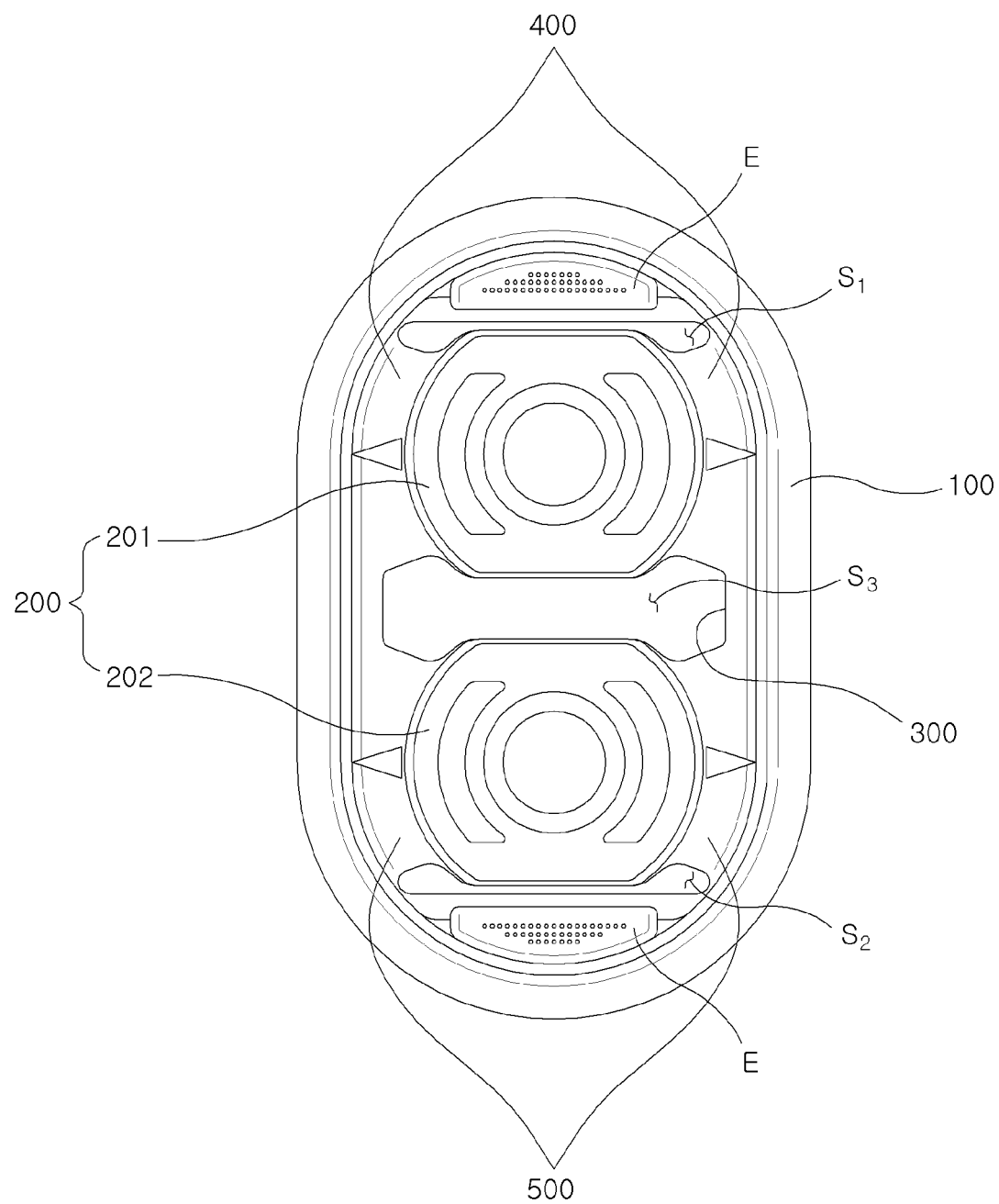
FIGS. 3 and 4 are plane diagrams of the subframe mounting bush in FIG. 1.

As illustrated in FIGS. 1 and 3, a first inner shell 201 and a second inner shell 202 are positioned in the outer shell 100. The first inner shell 201 and the second inner shell 202 are arranged at equal intervals along the width direction (D1) of the outer shell 100.

A rubber base part 300 is formed on the inner circumferential surface of the outer shell 100 in a ring form. The first bridge 400 and the second bridge 500 are formed along the longitudinal direction (D2) of the outer shell 100. Both ends of the first bridge 400 and the second bridge 500 are connected with the rubber base part 300. The first inner shell 201 is positioned at the center of the first bridge 400. The second inner shell 202 is positioned at the center of the second bridge 500.

In the inner circumferential surface of the outer shell 100, a first side surface space (S1) is formed between a portion adjacent to one end portion of the outer shell 100 in the width direction and the first bridge 400. In the inner circumferential surface of the outer shell 100, a second side surface space (S2) is formed between a portion adjacent to the other end portion of the outer shell 100 in the width direction and the second bridge 500. An inter-space (S3) is formed between the first bridge 400 and the second bridge 500.

The first side surface space (S1) and the second side surface space (S2) have the same size. The inter-space (S3) may be larger in size than the first side surface space (S1) or the second side surface space (S2).

In the inner circumferential surface of the outer shell 100, a reinforcement rubber (E) is provided in two portions adjacent to both end portions of the outer shell 100 in the width direction.

The first bridge 400 and the second bridge 500 are formed with a mounting hole (H) in which the first inner shell 201 or the second inner shell 202 is positioned. The central portion of the inner circumferential surface of the mounting hole (H) is a form that is protruded roundly toward the axis center thereof. Both end portions of the inner circumferential surface of the mounting hole (H) are a flat form.

Figure 5:
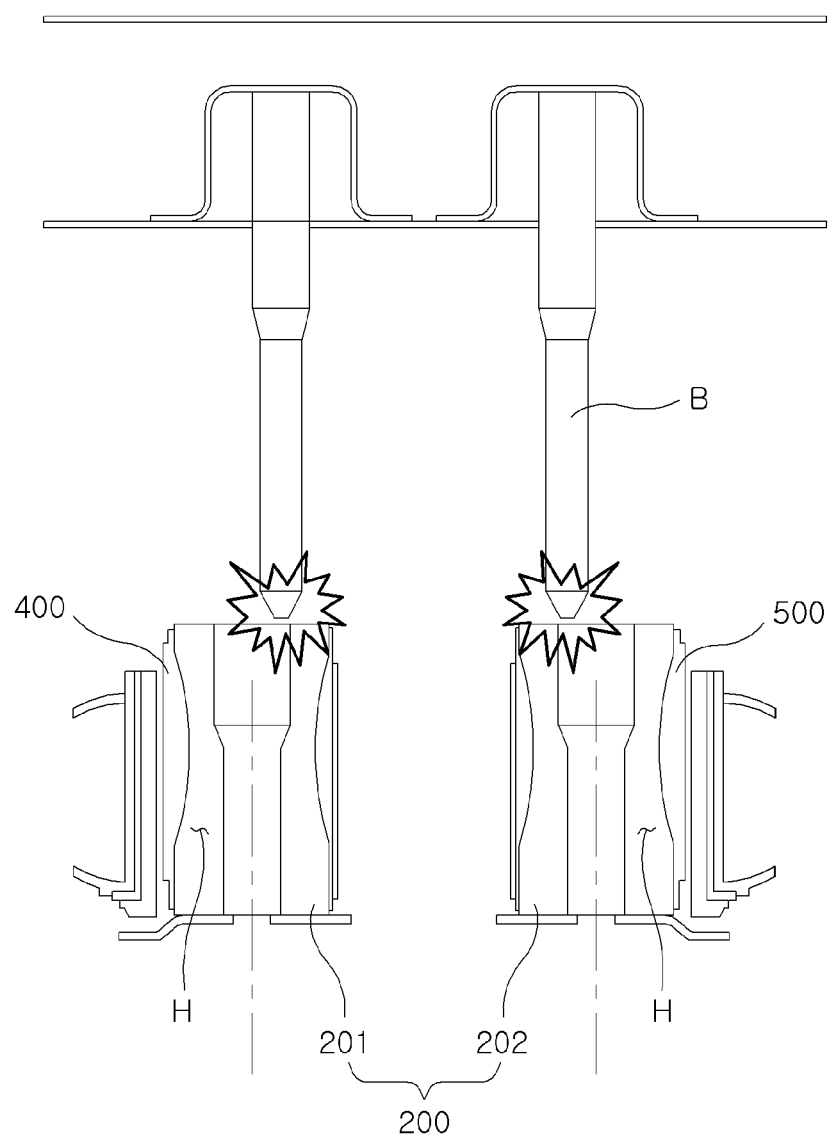
FIGS. 5 and 6 are exemplary diagrams illustrating a case where the interval between the inner shells of the subframe mounting bush in FIG. 1 is not constant.
Figure 6:
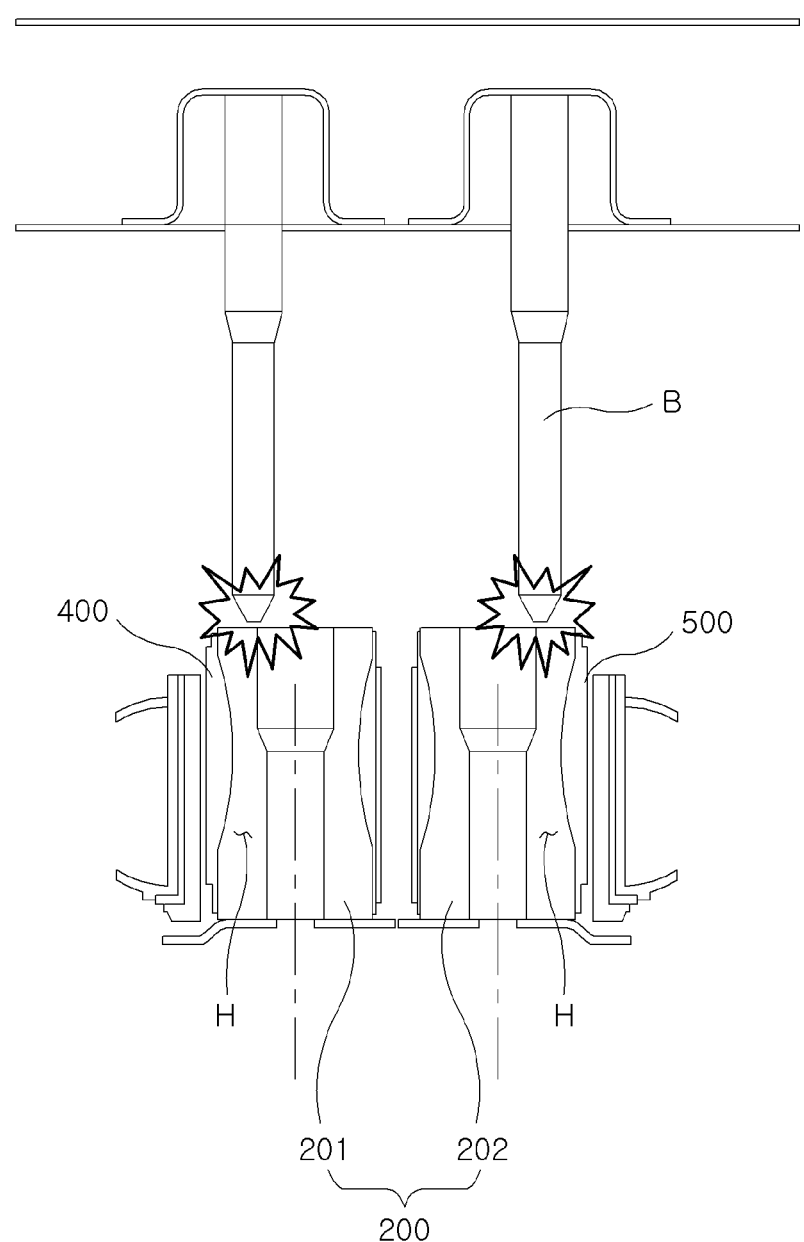

Meanwhile, as the first bridge 400 and the second bridge 500 do not contact each other, there is a case where the centers of the first inner shell 201 and the second inner shell 202 are biased inwards from the outer shell 100 or outwards from the outer shell 100 compared to the designed positions. In the case of such a bias, as illustrated in FIGS. 5 and 6, the interval between the bolts (B) fixed to the vehicle or the subframe and the interval between the first inner shell 201 and the second inner shell 202 are different from each other, and therefore, the bolt (B) may not be inserted into the first inner shell 201 or the second inner shell 202.

Figure 4:
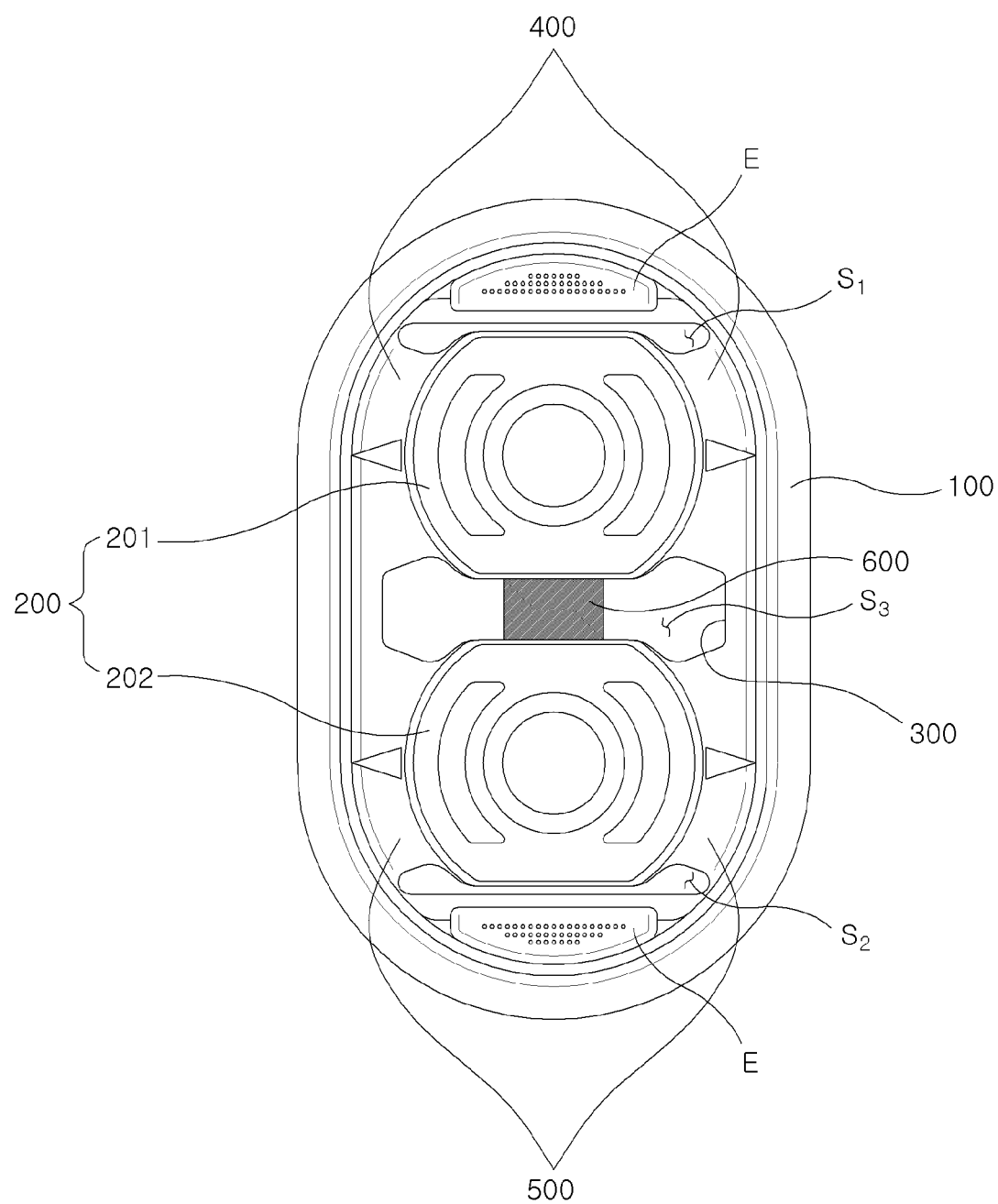

Consider this point, as illustrated in FIG. 4, a rubber bridge 600 may be provided between the first bridge 400 and the second bridge 500. The rubber bridge 600 is positioned in the inter-space (S1) to connect the first bridge 400 with the second bridge 500. The rubber bridge 600 is connected with the central portion of the mounting hole (H). The rubber bridge 600 is positioned on the line connecting the center of the first inner shell 201 with the center of the second inner shell 202. The rubber bridge 600 does not contact the inner circumferential surface of the outer shell 100, that is, the rubber base part 300.

Figure 7:
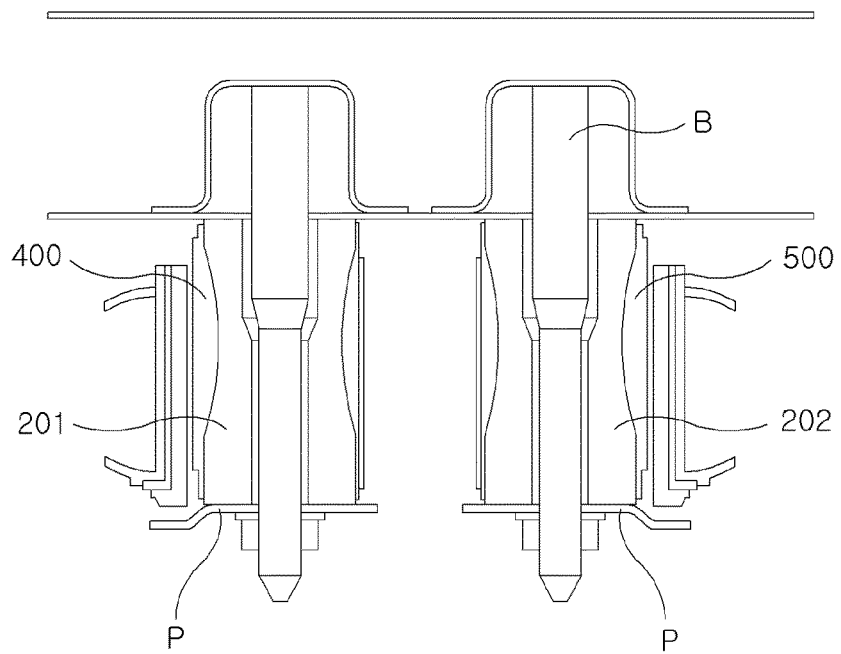
FIG. 7 is a cross-sectional diagram illustrating a state where a vehicle body and a subframe have been connected by the subframe mounting bush in FIG. 1.
Figure 7:
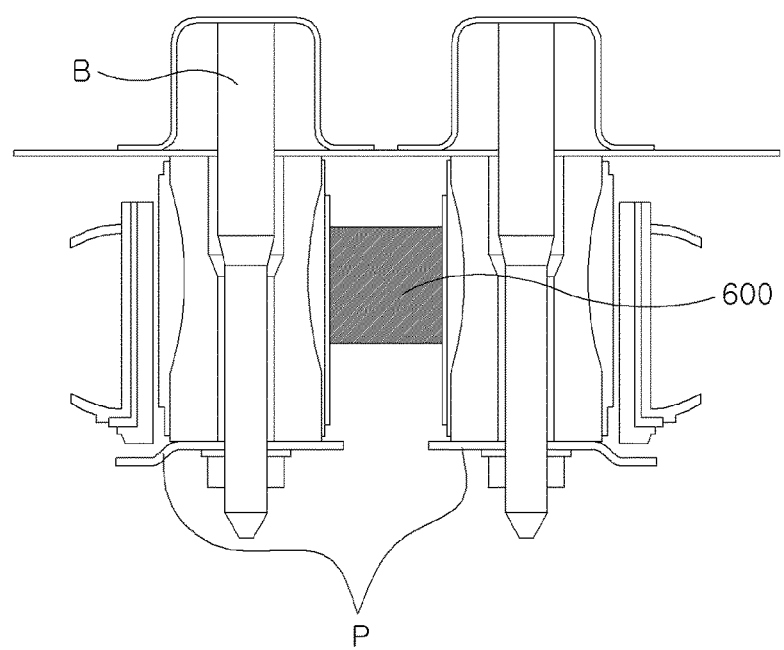

As illustrated in FIG. 7, when the vehicle body and the subframe are connected to each other, the lower plates (P) different from each other are disposed at one side of the first inner shell 201 and the second inner shell 202, respectively, so that the bolt (B) fixed to the vehicle body passes through. As the lower plate (P) is positioned below the first inner shell 201 or the second inner shell 202 in a state that has been separated from each other, a lateral force moving to the lower plate (P) through the first inner shell 201 or the second inner shell 202 is dispersed. Further, as each lower plate (P) and the first inner shell 201 or the second inner shell 202 are connected to each other, the vibration moving from the subframe to the vehicle body is dispersed.

The following Equations 1 and 2 represent the relationship between the handling load (Fy), the displacement (y) of the bridge, and the rigidity (Ks) of the bridge, in the case that one inner shell and one bridge have been embedded in the outer shell. In the following Equation 2, Fy/y refers to the lateral rigidity of the suspension.

$$Fy=Ks*y \qquad \text{Equation 1}$$

$$Fy/y=Ks \qquad \text{Equation 2}$$

The following Equations 3 and 4 represent the relationship between the handling load (Fy), the displacement (y) of the bridge, and the rigidity (Ks/2) of the bridge, in the case that two inner shells and two bridges have been embedded in the outer shell. In the following Equation 4, Fy/y refers to the lateral rigidity of the suspension.

$$Fy=(Ks/2+Ks/2)*y=Ks*y \qquad \text{Equation 3}$$

$$Fy/y=Ks \qquad \text{Equation 4}$$

That is, if two or two or more inner shells 200 and the bridges 400, 500 are embedded in the outer shell 100, the external force due to the handling load is dispersed to the two or more bridges 400, 500, such that even if the rigidities of the bridges 400, 500 are reduced to ½ or 1/(2+n), the same suspension lateral rigidity as the case where one inner shell and one bridge are embedded in the outer shell may be generated.

Figure 8:
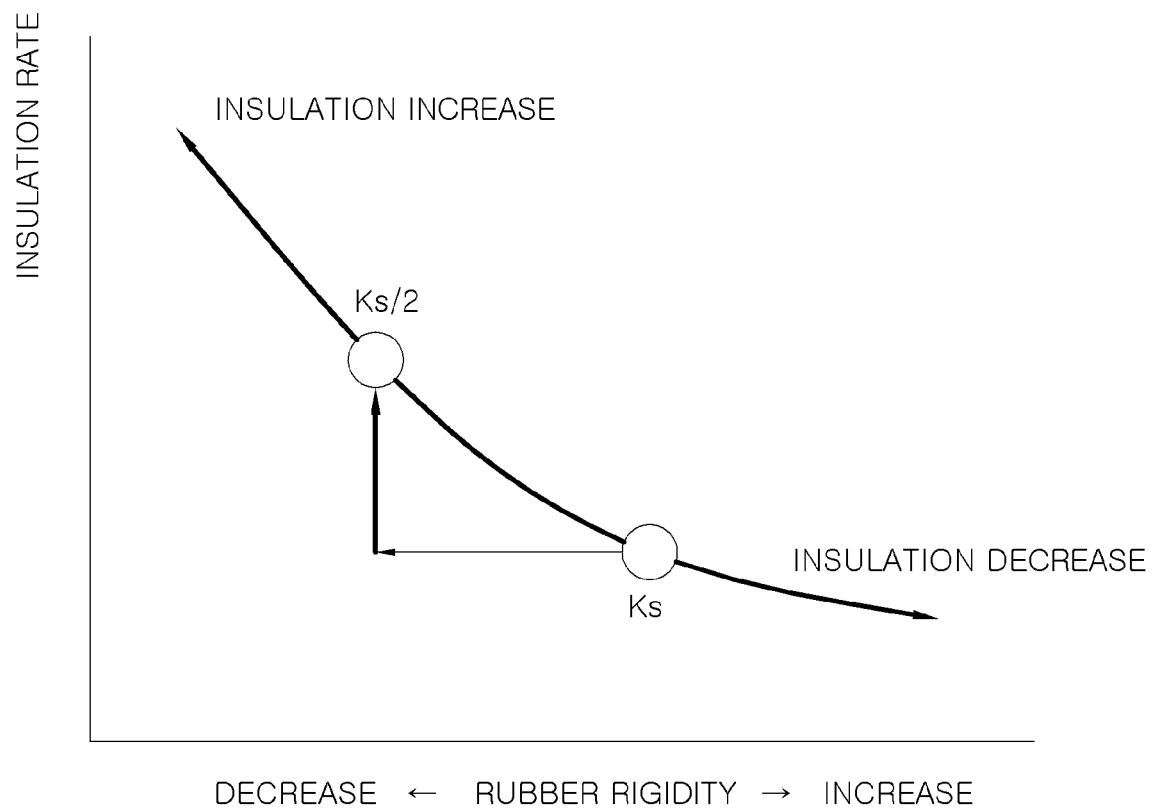
FIG. 8 is a graph illustrating the rubber rigidity and the vibration insulation rate.

Meanwhile, as illustrated in FIG. 8, it may be seen that the vibration insulation rate of the case where the two bridges 400, 500 having the rigidity of (Ks/2) have been provided in the outer shell 100 is increased much larger than the vibration insulation rate of the case where one bridge having the rigidity of (Ks) is provided in the outer shell 100.

That is, as described above, not only the vibration generated in the subframe is dispersed to reach the bridges 400, 500, but also the rigidities of the bridges 400, 500 are decreased to increase the vibration insulation rate, thereby reducing the vibration noise delivered from the subframe to the vehicle body compared to when one bridge is embedded in the outer shell 100.

According to the subframe mounting bush structure for improving the NVH performance according to an embodiment of the present disclosure configured as described above, it is possible to embed the two or more inner shells 200 and the two or more bridges 400, 500 in the outer shell wo, thereby enhancing the handling responsiveness, and also enhancing the vibration isolation.

Further, even if the rigidity of each of the two or more bridges 400, 500 embedded in the outer shell wo is reduced to 1/(2+n) compared to the rigidity of the bridge formed in the conventional outer shell, the same suspension lateral rigidity may be generated. Further, the vibration insulation rate increases as the rigidity of the bridge is decreased.

What is claimed is:

1. A subframe mounting bush structure comprising:
   an outer shell;
   a first bridge formed in the outer shell along a longitudinal direction;
   a second bridge formed in the outer shell along the longitudinal direction;
   a first inner shell positioned at a center of the first bridge;
   a second inner shell positioned at a center of the second bridge; and
   a rubber bridge provided between the first bridge and the second bridge;
   wherein the rubber bridge is positioned on a line connecting the first inner shell with the second inner shell;
   wherein the rubber bridge does not contact an inner circumferential surface of the outer shell; and
   wherein when a vehicle body and a subframe are connected to each other, lower plates different from each other are disposed at one side of the first inner shell and the second inner shell, respectively, so that a bolt fixed to the vehicle body can pass through.

2. The subframe mounting bush structure of claim 1, wherein the outer shell is an elliptic pipe form in which a length of a width direction is larger than a length of the longitudinal direction.

3. The subframe mounting bush structure of claim 1, further comprising:
   in an inner circumferential surface of the outer shell, a first side surface space formed between a portion adjacent to a first end portion of the outer shell in a width direction and the first bridge;
   in the inner circumferential surface of the outer shell, a second side surface space formed between a portion adjacent to a second end portion of the outer shell in the width direction and the second bridge; and
   an inter-space formed between the first bridge and the second bridge.

4. The subframe mounting bush structure of claim 3,
   wherein the first side surface space and the second side surface space are a same size, and
   wherein the inter-space is larger in size than the first side surface space or the second side surface space.

5. The subframe mounting bush structure of claim 3, further comprising, in the inner circumferential surface of the outer shell, a reinforcement rubber provided on a portion adjacent to both end portions of the outer shell in the width direction.

6. The subframe mounting bush structure of claim 3, further comprising:
   a mounting hole formed in the first bridge or the second bridge, wherein the first inner shell or the second inner shell is positioned at a center thereof,
   wherein a central portion of an inner circumferential surface of the mounting hole is a form that is protruded roundly toward an axis center thereof, and
   wherein both end portions of the inner circumferential surface of the mounting hole are a flat form.

7. The subframe mounting bush structure of claim 6, further comprising:
   a rubber bridge positioned in the inter-space, wherein the rubber bridge is configured to connect the first bridge with the second bridge,
   wherein the rubber bridge is connected with the central portion of the inner circumferential surface of the mounting hole.

8. The subframe mounting bush structure of claim 1,
   wherein rigidities of the first bridge and the second bridge are the same as each other.

9. The subframe mounting bush structure of claim 1, further comprising:
   at least one additional bridge formed in the outer shell; and
   an additional inner shell positioned at a center of the additional bridge.

10. The subframe mounting bush structure of claim 9, wherein rigidities of the bridges formed in the outer shell are the same as each other.

11. The subframe mounting bush structure of claim 1, further comprising:
    a rubber member having a ring form provided in an inner circumferential surface of the outer shell, wherein end portions of the first bridge and the second bridge are connected to the rubber member.

12. A subframe mounting bush structure comprising:
an outer shell formed so that a length of a width direction is longer than that of a longitudinal direction;
two or more inner shells provided in the outer shell;
two or more bridges formed in the outer shell, the two or more bridges configured to fix the two or more inner shells, wherein rigidities of the two or more bridges are the same as each other; and
a rubber bridge provided between the two or more bridges;
wherein the rubber bridge is positioned on a line connecting a first inner shell with a second inner shell;
wherein the rubber bridge does not contact an inner circumferential surface of the outer shell; and
wherein when a vehicle body and a subframe are connected to each other, lower plates different from each other are disposed at one side of the two or more inner shells, respectively, so that a bolt fixed to the vehicle body can pass through.

13. A vehicle that includes the subframe mounting bush structure of claim 1, the vehicle comprising:
the vehicle body;
the subframe; and
the subframe mounting bush structure connecting the vehicle body and the subframe.

14. The vehicle of claim 13, wherein the outer shell is an elliptic pipe form in which a length of a width direction is larger than a length of the longitudinal direction.

15. The vehicle of claim 13, further comprising:
in an inner circumferential surface of the outer shell, a first side surface space provided between the first bridge and a portion adjacent to a first end portion of the outer shell in a width direction;
in the inner circumferential surface of the outer shell, a second side surface space provided between the second bridge and a portion adjacent to a second end portion of the outer shell in the width direction; and
an inter-space provided between the first bridge and the second bridge, wherein the first side surface space and the second side surface space are a same size, and wherein the inter-space is larger in size than the first side surface space or the second side surface space.

16. The vehicle of claim 15, further comprising, in the inner circumferential surface of the outer shell, a reinforcement rubber provided on a portion adjacent to both end portions of the outer shell in the width direction.

17. The vehicle of claim 15, further comprising:
a mounting hole formed in the first bridge or the second bridge, wherein the first inner shell or the second inner shell is positioned at a center thereof; and
a rubber bridge configured to connect the first bridge with the second bridge is provided in the inter-space,
wherein a central portion of the inner circumferential surface of the mounting hole is a form that is protruded roundly toward an axis center thereof,
wherein both end portions of the inner circumferential surface of the mounting hole are a flat form, and
wherein the rubber bridge is connected with the central portion of the inner circumferential surface of the mounting hole.

18. The vehicle of claim 13, further comprising a rubber member having a ring form provided in an inner circumferential surface of the outer shell, wherein end portions of the first bridge and the second bridge are connected to the rubber member.

19. A subframe mounting bush structure comprising:
an outer shell;
a first bridge formed in the outer shell along a longitudinal direction;
a second bridge formed in the outer shell along the longitudinal direction;
a first inner shell positioned at a center of the first bridge;
a second inner shell positioned at a center of the second bridge;
in an inner circumferential surface of the outer shell, a first side surface space provided between the first bridge and a portion adjacent to a first end portion of the outer shell in a width direction;
in the inner circumferential surface of the outer shell, a second side surface space provided between the second bridge and a portion adjacent to a second end portion of the outer shell in the width direction;
an inter-space provided between the first bridge and the second bridge, wherein the first side surface space and the second side surface space are a same size, and wherein the inter-space is larger in size than the first side surface space or the second side surface space;
a mounting hole formed in the first bridge or the second bridge, wherein the first inner shell or the second inner shell is positioned at a center thereof; and
a rubber bridge configured to connect the first bridge with the second bridge is provided in the inter-space;
wherein a central portion of the inner circumferential surface of the mounting hole is a form that is protruded roundly toward an axis center thereof;
wherein both end portions of the inner circumferential surface of the mounting hole are a flat form; and
wherein the rubber bridge is connected with the central portion of the inner circumferential surface of the mounting hole.

* * * * *